United States Patent
Krupka

(10) Patent No.: US 7,099,386 B2
(45) Date of Patent: Aug. 29, 2006

(54) CHANNEL TRACKING USING CHANNEL COVARIANCE ESTIMATION

(75) Inventor: Eyal Krupka, Ramat-Gan (IL)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 09/901,323

(22) Filed: Jul. 9, 2001

(65) Prior Publication Data

US 2003/0012314 A1    Jan. 16, 2003

(51) Int. Cl.
*H03H 7/30* (2006.01)
*H03D 1/06* (2006.01)

(52) U.S. Cl. ........................ 375/232; 375/348

(58) Field of Classification Search ................ 375/229, 375/230, 231, 232, 233, 348, 350
See application file for complete search history.

(56) References Cited

U.S. PATENT DOCUMENTS

| | | | |
|---|---|---|---|
| 5,475,710 A * | 12/1995 | Ishizu et al. | ................ 375/232 |
| 6,421,380 B1 * | 7/2002 | Gu et al. | .................... 375/232 |
| 6,658,047 B1 * | 12/2003 | Komulainen et al. | ....... 375/150 |

* cited by examiner

*Primary Examiner*—Kevin Kim
(74) *Attorney, Agent, or Firm*—Schwegman, Lundberg, Woessner & Kluth, P.A.

(57) ABSTRACT

Channel tracking is performed using a channel taps covariance matrix. In one embodiment, the channel taps covariance matrix may be used as part of the step term of an adaptive algorithm.

20 Claims, 2 Drawing Sheets

CHANNEL TRACKING USING CHANNEL COVARIANCE ESTIMATION

FIELD OF THE INVENTION

The invention relates generally to communication systems and, more particularly, to techniques and structures for performing channel tracking in such systems.

BACKGROUND OF THE INVENTION

Many communication devices utilize a channel estimate to accurately detect data within a signal received from a communication channel. In one approach, the channel estimate is used to determine a set of channel taps to be used by an equalizer to remove certain channel effects from the received signal. In systems where the channel characteristics do not change significantly over time (i.e., time invariant channels), a single set of channel taps may be determined at the start of transmission (or before the start of transmission) and used for the duration of the subsequent communication. Such a technique is referred to as preset equalization. In systems where channel characteristics are expected to change with time (e.g., in mobile communication systems), channel tap adjustments are typically made periodically or continuously during the communication in a process known as adaptive equalization. One form of adaptive equalization that is commonly implemented in communication systems uses the well known least-mean-square (LMS) algorithm to adaptively modify the channel taps. The LMS algorithm is an iterative technique that utilizes a noisy estimate of an error gradient during each iteration to adjust the estimated channel taps in a manner that reduces average mean-square error (MSE). As can be appreciated, techniques and structures for enhancing the effectiveness and/or accuracy of LMS-based adaptive equalization are generally desired.

DETAILED DESCRIPTION

Figure 1:
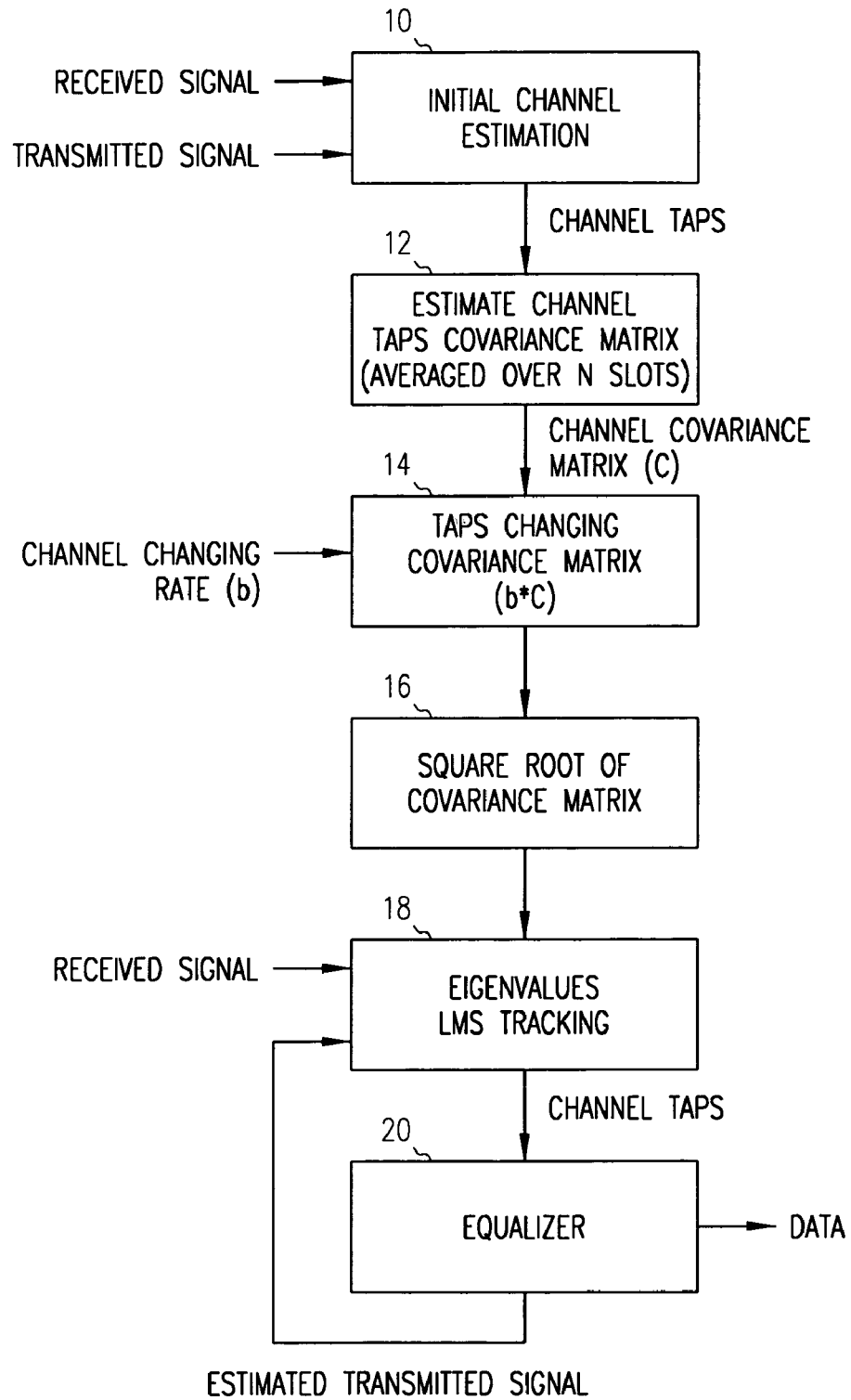
FIG. 1 is a flow chart illustrating a method for processing signals received from a communication channel in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to techniques and structures for performing channel tracking within a communication system using a channel tap covariance matrix. In a preferred approach, the covariance matrix is made part of the adaptation algorithm. The channel taps may then be updated by, among other things, tracking the projection of the channel on the eigenvectors of the channel covariance matrix. The inventive principles may be implemented in a wide range of communication applications that involve a time varying channel (e.g., systems having one or more mobile users). The inventive principles may be used, for example, to enhance the performance of LMS-based based adaptive equalization schemes. In addition, the principles have application in both wired and wireless systems.

In some communication channels, there is no correlation between the changing of one channel tap and the changing of the other channel taps. In such systems, the channel taps are said to be "statistically independent" of one another. In other channels, the changing channel taps are correlated to one another. In these systems, the channel taps are said to be "statistically dependent" upon one another. In conceiving the present invention, it was appreciated that knowledge about the correlation between the changing channel taps in a "statistically dependent" system could be used to enhance channel tracking performance within a communication device. In many wireless communication channels (e.g., those using a pulse shaping filter), the channel taps are statistically dependent upon one another and significant benefits may be derived by implementing the inventive principles. In the description that follows, the inventive principles will be discussed in the context of an LMS-based adaptive equalization scheme. It should be appreciated that the inventive principles may also be beneficially implemented in systems using other adaptive equalization techniques.

In its conventional form, the least-mean-square (LMS) algorithm may be described by the following equation:

$$\underline{h}_k = \underline{h}_{k-1} + \mu e_k \underline{s}_k$$

where $\underline{h}_k$ is a column vector of the estimated channel taps at the time of symbol k, $\underline{h}_{k-1}$ is the estimated channel taps at the time of previous symbol k−1, μ is the LMS step factor, $e_k$ is the difference between the expected signal and the actual received signal (i.e., the error), and $\underline{s}_k$ is the complex conjugate of the last L modulated symbols at the time of symbol k (where L is the channel length). The error $e_k$ may be calculated using the following equation:

$$e_k = \underline{s}_k^H \underline{h}_{k-1} - y_k$$

where $y_k$ is the received signal sample at the time of symbol k. The LMS step factor μ controls the step size of the tracking. This constant may be optimized based upon the signal-to-noise ratio and the expected channel changing rate. The values of $\underline{s}_k$ may be derived from the output of the equalizer to form a decision-directed adaptive process.

The covariance matrix of the change in channel may be expressed as a function of the channel taps covariance matrix $\underline{C}$ as follows:

$$E[(\underline{h}_k - \underline{h}_{k-1})(\underline{h}_k - \underline{h}_{k-1})^H] = b\underline{C}$$

where E[ ] is the expectation function and b is a constant that depends upon the changing rate of the channel (which depends upon vehicle speed in wireless communication).

For a fading channel, it may generally be assumed that each channel tap average changing rate is proportional to its average energy. In one approach, the channel tap covariance matrix $\underline{C}$ is estimated as follows:

$$\hat{\underline{C}} = E(\underline{h}\underline{h}^H) = \frac{1}{N}\sum_{i=1}^{N} \underline{h}_i \underline{h}_i^H$$

where N is the number of training sequences used for estimating the covariance matrix and $\underline{h}_i$ is the vector of channel taps at training sequence i. The covariance matrix may also be estimated based on knowledge about the filters in the transmitter and receiver. Other methods for estimating or calculating the channel taps covariance matrix $\underline{C}$ are also known. The covariance matrix $\underline{C}$ may be described as a combination of its eigenvectors and eigenvalues as follows:

$$\underline{C} = \underline{V}\underline{\Lambda}\underline{V}^H$$

where $\underline{\Lambda}$ is the diagonal matrix of eigenvalues of $\underline{C}$ and $\underline{V}$ is a matrix whose columns are the corresponding eigenvectors of $\underline{C}$. The channel tap vector $\underline{h}$ may be decomposed into the eigenvectors $\underline{V}$ as follows:

$$\underline{h}_k = \underline{V}\underline{D}_k$$

where $\underline{D}_k$ are the coefficients of each eigenvector ($\underline{D}_k \sim N(0, \underline{\Lambda})$). The projection of the conventional LMS step on the channel eigenvectors is expressed as:

$$\underline{V}^H \mu e_k \underline{s}_k$$

Using this projection, the coefficients $\underline{D}_k$ are updated according to the following equation:

$$\underline{D}_k = \underline{D}_{k-1} + \underline{U}\mu e_k \underline{V}^H \underline{s}_k$$

where $\underline{U}$ is the diagonal matrix of the square root of the eigenvalues ($\underline{V}\underline{U}\underline{V}^H = \underline{C}^{1/2}$). Multiplying the above equation by the matrix $\underline{V}$ gives:

$$\underline{V}\underline{D}_k = \underline{V}\underline{D}_{k-1} + \mu e_k \underline{V}\underline{U}\underline{V}^H \underline{s}_k; \text{ or}$$

$$\underline{h}_k = \underline{h}_{k-1} + \mu e_k \underline{V}\underline{U}\underline{V}^H \underline{s}_k$$

This last equation may be rewritten as:

$$\underline{h}_k = \underline{h}_{k-1} + \mu e_k \underline{C}^{1/2} \underline{s}_k$$

where $\underline{C}^{1/2}$ is the square root of the covariance matrix $\underline{C}$. This is a modified version of the conventional LMS algorithm.

If the taps associated with a communication channel are statistically independent of one another, the covariance matrix will be a unit matrix (or a unit matrix multiplied by a constant) and the above modified LMS algorithm will reduce to the conventional LMS algorithm described previously. If the taps associated with a communication channel are statistically dependent upon one another, on the other hand, the covariance matrix will not be diagonal and the modified algorithm set out above may be used to significantly enhance the error rate performance of a system over the conventional algorithm. As described above, most wireless communication systems being deployed today have channel taps that are statistically dependent.

FIG. 1 is a flow chart illustrating a method for processing signals received from a wireless communication channel in accordance with an embodiment of the present invention. In one approach, the method is implemented within a modulation-demodulation device (i.e., a modem), although other implementations are also possible. First, an initial channel estimation is performed using a received signal and a priori knowledge (e.g., training sequences) of the corresponding transmitted data (block 10). In one approach, the least squares (LS) method is used to perform the initial channel estimation, although other methods may alternatively be used. The initial channel estimation may generate a vector of channel tap values for each of a plurality of training sequences used. A channel tap covariance matrix $\underline{C}$ is estimated based on the estimated channel (block 12). In one approach, this matrix is estimated using the following equation:

$$\hat{\underline{C}} = E(\underline{h}\underline{h}^H) = \frac{1}{N}\sum_{i=1}^{N} \underline{h}_i \underline{h}_i^H$$

where N is the number of training sequences used for estimating the covariance matrix and $\underline{h}_i$ is the vector of channel taps at training sequence i. The covariance matrix $\underline{C}$ is then multiplied by a constant b related to the channel changing rate to generate a taps changing covariance matrix (block 14). The constant b is normally application specific and will typically, be optimized depending on the channel fading process. A square root of the taps changing covariance matrix is next determined (block 16). As described previously, this square root information is used within the modified LMS algorithm. Eigenvalue LMS tracking is then performed to update the estimated channel taps based on newly received data and decision information fed back from an equalizer (block 18). As described previously, in one approach, the updates are made according to the modified LMS algorithm:

$$\underline{h}_k = \underline{h}_{k-1} + \mu e_k \underline{C}^{1/2} \underline{s}_k$$

The updated channel taps are transferred to the equalizer which uses them to process corresponding signals received from the channel to detect data therein (block 20). In some cases, it is expected that the covariance matrix $\underline{C}$ will change slowly so that the eigenvectors may only need to be determined (e.g., by calculating the square root of the covariance matrix) at intervals (e.g., once every X slots) rather than continuously. Alternatively, an algorithm may be used to track the projection of the channel on the eigenvectors. In some cases, it may be sufficient to track only the projection of the channel on the eigenvector(s) with the highest eigenvalue(s). The projection of the channel on other vectors may be left unchanged (not tracked). One method of doing this is by replacing small eigenvalues in the matrix of eigenvalues by zero. The covariance matrix C will normally be band diagonal.

Figure 2:
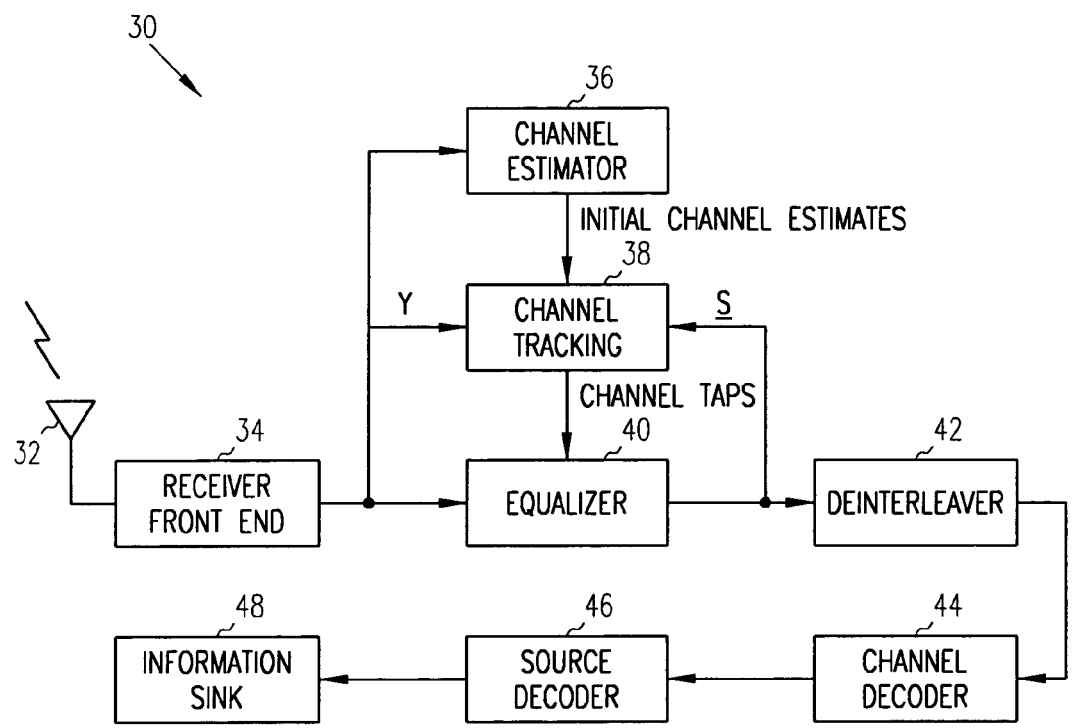
FIG. 2 is a block diagram illustrating receiver functionality within a wireless communication device in accordance with an embodiment of the present invention.

FIG. 2 is a block diagram illustrating receiver functionality within a wireless communication device 30 in accordance with an embodiment of the present invention. The communication device 30 may include any of a wide variety of different devices including, for example, mobile devices (e.g., a cellular telephone or other handheld communicator, a laptop computer or personal digital assistant (PDA) including wireless transceiver functionality, etc.) and stationary devices (e.g., a basestation transceiver, etc.). As illustrated, the communication device 30 includes: an antenna 32, a receiver front end 34, a channel estimator 36, a channel tracking unit 38, an equalizer 40, a deinterleaver 42, a channel decoder 44, a source decoder 46, and an information sink 48. The antenna 32 is operative for receiving signals from a wireless communication channel. The antenna 32 may also act as a transmit antenna for the device 30. The receiver front end 34 converts signals received from the wireless channel into a baseband representation that is more easily processed within the device.

When a communication link is first being established, a plurality of training sequences are transmitted to the communication device 30 through the wireless communication channel. The training sequences are received by the antenna 32 and converted to a baseband representation by the receiver front end 34. The received training sequences are then input into the channel estimator 36 which uses the received sequences to determine initial channel estimates for the wireless channel (using, for example, a least squares approach). The channel estimator 36 may have a priori knowledge of the transmitted training sequences which it compares to the received signals to determine the initial channel estimates. The initial channel estimates may then be delivered to the channel tracking unit 38. Eventually, the transmission of training sequences to the communication device 30 ends and the transmission of user data begins. The data signals are received by the antenna 32 and converted to a baseband representation within the receiver front end 34. The data signals are then delivered to the input of the equalizer 40 which filters the signals in a manner dictated by the channel taps currently being applied to the equalizer 40. The equalizer 40 may include any type of equalizer structure (including, for example, a transversal filter, a maximum likelihood sequence estimator (MLSE), and others). When properly configured, the equalizer 40 may reduce or eliminate undesirable channel effects within the received signals (e.g., inter-symbol interference).

The received data signals are also delivered to the input of the channel tracking unit 38 which uses the received signals to track the channel taps applied to the equalizer 40. During system operation, these taps are regularly updated by the channel tracking unit 38 based on changes in the wireless channel. In addition to the receive data, the channel tracking unit 38 also receives data from an output of the equalizer 40 as feedback for use in the channel tracking process. The channel tracking unit 38 uses the initial channel estimates determined by the channel estimator 36 to determine the channel taps covariance matrix ($\underline{C}$). The channel tracking unit 38 then determines the value of the constant b (related to the channel changing rate) and calculates the taps changing covariance matrix (b*$\underline{C}$). The square root of the taps changing covariance matrix is then determined and used within the modified LMS algorithm to determine the updated channel taps, which are then applied to the equalizer 40. The output of the equalizer 40 is deinterleaved in the deinterleaver 42. Channel and source coding is then removed from the signal in the channel decoder 44 and the source decoder 46, respectively. The resulting information is then delivered to the information sink 48 which may include a user device, a memory, or other data destination.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A communication apparatus comprising:
   means for obtaining channel taps associated with a communication channel;
   means for determining a channel taps covariance matrix for said communication channel using said channel taps; and
   means for updating said channel taps using said channel taps covariance matrix including means for multiplying said channel taps covariance matrix by a constant related to a changing rate of said channel to achieve a taps changing covariance matrix.

2. The communication apparatus of claim 1, wherein:
   said means for determining a channel taps covariance matrix includes means for estimating said channel taps covariance matrix based upon the following equation:

$$\hat{\underline{C}} = \frac{1}{N}\sum_{i=1}^{N} \underline{h}_i \underline{h}_i^H$$

where N is the number of training sequences used for estimating the channel taps covariance matrix and $\underline{h}_i$ is a vector of channel taps at training sequence i.

3. The communication apparatus of claim 1, wherein:
   said means for updating said channel taps includes means for determining a square root of said taps changing covariance matrix.

4. The communication apparatus of claim 1, wherein:
   said means for updating said channel taps includes means for implementing the following equation:

$$\underline{h}_k = \underline{h}_{k-1} + \mu e_k \underline{C}^{1/2} \underline{s}_k$$

where $\underline{h}_k$ represents the channel taps at the time of a symbol k, $\underline{h}_{k-1}$ represents the channel taps at the time of a previous symbol k−1, μ is a step factor, $e_k$ is an error between an expected signal and an actual received signal, $\underline{s}_k$ is a complex conjugate of a number of previous symbol decisions at the time of symbol k, and $\underline{C}^{1/2}$ is the square root of the covariance matrix $\underline{C}$.

5. A communication apparatus comprising:
   an equalizer to process signals received from a communication channel to reduce channel effects within said signals, said equalizer including at least one input to receive channel taps for use in configuring said equalizer; and
   a channel tracking unit to update said channel taps based upon an output of said equalizer and a covariance matrix associated with said channel taps, said channel tracking unit including a covariance matrix estimator for estimating said covariance matrix associated with said channel taps and a multiplication unit for multiplying said estimated covariance matrix by a constant related to a changing rate of said communication channel to generate a taps changing covariance matrix.

6. The communication apparatus of claim 5, wherein:
   said channel tracking unit includes a square root unit to determine a square root of said taps changing covariance matrix.

7. The communication apparatus of claim 5, wherein:
   said channel tracking unit updates said channel taps using the following equation:

$$\underline{h}_k = \underline{h}_{k-1} + \mu e_k \underline{C}^{1/2} \underline{s}_k$$

where $\underline{h}_k$ represents the channel taps at the time of a symbol k, $\underline{h}_{k-1}$ represents the channel taps at the time of a previous symbol k−1, μ is a step factor, $e_k$ is an error between an expected signal and an actual received signal, $\underline{s}_k$ is a complex conjugate of a number of previous symbol decisions at the time of symbol k, and $\underline{C}^{1/2}$ is the square root of the covariance matrix $\underline{C}$.

8. The communication apparatus of claim 5, wherein: said channel tracking unit includes means for tracking a projection of the channel on eigenvectors associated with said covariance matrix.

9. The communication apparatus of claim 8, wherein: said means for tracking only tracks the projection of the channel on eigenvectors having associated eigenvalues that exceed a predetermined value.

10. A method for performing channel tracking in a communication system comprising:
obtaining channel taps associated with a communication channel;
estimating a channel taps covariance matrix for said communication channel using said channel taps including calculating the following summation:

$$\hat{\underline{C}} = \frac{1}{N} \sum_{i=1}^{N} h_i h_i^H$$

where N is the number of training sequences used for estimating the covariance matrix and $h_i$ is the vector of channel taps at training sequence i; and
updating said channel taps based on said channel taps covariance matrix.

11. The method of claim 10, wherein:
updating includes using a modified least mean square (LMS) algorithm to calculate new values for said channel taps, said modified LMS algorithm using said channel taps covariance matrix.

12. The method of claim 11, wherein:
said modified LMS algorithm is expressed as follows:

$$\underline{h}_k = \underline{h}_{k-1} + \mu e_k \underline{C}^{1/2} \underline{s}_k$$

where $\underline{h}_k$ represents the channel taps at the time of a symbol k, $\underline{h}_{k-1}$ represents the channel taps at the time of a previous symbol k−1, μis a step factor, $e_k$ is an error between an expected signal and an actual received signal, $\underline{s}_k$ is a complex conjugate of a number of previous symbol decisions at the time of symbol k, and $\underline{C}^{1/2}$ is the square root of the covariance matrix $\underline{C}$.

13. A computer readable medium having program instructions stored thereon for implementing, when executed within a digital processing device, a method for performing channel tracking, said method comprising:
obtaining channel taps associated with a communication channel;
estimating a channel taps covariance matrix for said communication channel using said channel taps; and
updating said channel taps based on said channel taps covariance matrix including multiplying said channel taps covariance matrix by a constant related to a changing rate of said channel to achieve a taps changing covariance matrix.

14. The computer readable medium of claim 13, wherein:
estimating a channel taps covariance matrix for said communication channel includes calculating the following summation:

$$\hat{\underline{C}} = \frac{1}{N} \sum_{i=1}^{N} h_i h_i^H$$

where N is the number of training sequences used for estimating the covariance matrix and $h_i$ is the vector of channel taps at training sequence i.

15. A communication apparatus comprising:
an equalizer to process signals received from a communication channel, said equalizer having a transfer function that depends upon a plurality of channel taps;
a channel estimator to determine initial channel taps for said communication channel; and
a channel tracking unit to track said plurality of channel taps over time, said channel tracking unit including:
a covariance matrix estimator to estimate a covariance matrix associated with said plurality of channel taps; and
an update unit to update said plurality of channel taps based on said estimated covariance matrix, said update unit updates said plurality of channel taps based on the following equation:

$$\underline{h}_k = \underline{h}_{k-1} + \mu e_k \underline{C}^{1/2} \underline{s}_k$$

where $h_k$ represents the channel taps at the time of a symbol k, $h_{k-1}$ represents the channel taps at the time of a previous symbol k−1, μ is a step factor, $e_k$ is an error between an expected signal and an actual received signal, $s_k$ is a complex conjugate of a number of previous symbol decisions at the time of symbol k, and $C^{1/2}$ is the square root of the covariance matrix C.

16. The communication apparatus of claim 15 wherein:
said channel estimator determines said initial channel taps using training sequences received from said wireless communication channel, said channel estimator having a priori knowledge of said training sequences.

17. The communication apparatus of claim 15 wherein:
said channel estimator determines said initial channel taps using a least squares technique.

18. The communication apparatus of claim 15 wherein:
said covariance matrix estimator estimates an initial covariance matrix based on an output of said channel estimator.

19. The computer readable medium of claim 13, wherein:
updating includes using a modified least mean square (LMS) algorithm to calculate new values for said channel taps, said modified LMS algorithm using said channel taps covariance matrix.

20. The computer readable medium of claim 13, wherein:
updating said channel taps includes determining a square root of said taps changing covariance matrix.

* * * * *

UNITED STATES PATENT AND TRADEMARK OFFICE
CERTIFICATE OF CORRECTION

PATENT NO. : 7,099,386 B2
APPLICATION NO. : 09/901323
DATED : August 29, 2006
INVENTOR(S) : Krupka Page 1 of 1

It is certified that error appears in the above-identified patent and that said Letters Patent is hereby corrected as shown below:

In column 6, line 41, in Claim 4, deleted "$\underline{C}^{1/2}$" and insert -- $\underline{\mathbf{C}}^{1/2}$ --, therefor.

In column 6, line 67, in Claim 7, delete "$\underline{h}_k=\underline{h}_{k-1}+\mu e_k \underline{C}^{1/2}\underline{s}_k$" and insert -- $\underline{h}_k=\underline{h}_{k-1}+\mu e_k \underline{\mathbf{C}}^{1/2}\underline{s}_k$ --, therefor.

In column 7, line 6, in Cliam 7, delete "$\underline{C}^{1/2}$" and insert -- $\underline{\mathbf{C}}^{1/2}$ --, therefor.

In column 7, line 30, in Claim 10, delete "$\underline{h}_i$" and insert -- $\underline{h}_i$ --, therefor.

In column 7, line 42, in Claim 12, delete "$\underline{h}_k=\underline{h}_{k-1}+\mu e_k \underline{C}^{1/2}\underline{s}_k$" and insert -- $\underline{h}_k=\underline{h}_{k-1}+\mu e_k \underline{\mathbf{C}}^{1/2}\underline{s}_k$ --, therefor.

In column 7, line 45, in Claim 12, delete "μis" and insert -- μ is --, therefor.

In column 7, line 48, in Claim 12, delete "$\underline{C}^{1/2}$" and insert -- $\underline{\mathbf{C}}^{1/2}$ --, therefor.

In column 8, line 12, in Claim 14, delete "$\underline{h}_i$" and insert -- $\underline{h}_i$ --, therefor.

In column 8, line 31, in Claim 15, delete "$\underline{h}_k=\underline{h}_{k-1}+\mu e_k \underline{C}^{1/2}\underline{s}_k$" and insert -- $\underline{h}_k=\underline{h}_{k-1}+\mu e_k \underline{\mathbf{C}}^{1/2}\underline{s}_k$ --, therefor.

In column 8, line 33, in Claim 15, delete "$\underline{h}_k$" and insert -- $\underline{h}_k$ --, therefor In column 8, line 34, in Claim 15, delete "$\underline{h}_{k-1}$" and insert -- $\underline{h}_{k-1}$ --, therefor.

In column 8, line 36, in Claim 15, delete "$\underline{s}_k$" and insert -- $\underline{s}_k$ --, therefor.

In column 8, line 38, in Claim 15, delete "$\underline{C}^{1/2}$" and insert -- $\underline{\mathbf{C}}^{1/2}$ --, therefor.

In column 8, line 39, in Claim 15, delete "C" and insert -- $\underline{\mathbf{C}}$ --, therefor.

Signed and Sealed this

Twelfth Day of December, 2006

JON W. DUDAS
*Director of the United States Patent and Trademark Office*